United States Patent
Lu et al.

(10) Patent No.: US 10,319,312 B2
(45) Date of Patent: Jun. 11, 2019

(54) IN-VEHICLE REAR-VIEW DISPLAY SYSTEM AND DISPLAY METHOD

(71) Applicants: Boe Technology Group Co., Ltd., Beijing (CN); Beijing Boe Optoelectronics Technology Co., Ltd., Beijing (CN)

(72) Inventors: Pengcheng Lu, Beijing (CN); Xiaochuan Chen, Beijing (CN); Wenqing Zhao, Beijing (CN); Lei Wang, Beijing (CN); Ming Yang, Beijing (CN); Qian Wang, Beijing (CN); Rui Xu, Beijing (CN); Jian Gao, Beijing (CN); Xiaochen Niu, Beijing (CN); Haisheng Wang, Beijing (CN); Changfeng Li, Beijing (CN); Peizhi Cai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/207,300

(22) Filed: Jul. 11, 2016

(65) Prior Publication Data
US 2017/0221425 A1     Aug. 3, 2017

(30) Foreign Application Priority Data
Feb. 2, 2016     (CN) .......................... 2016 1 0073154

(51) Int. Cl.
*G09G 3/34*     (2006.01)
*B60R 1/08*     (2006.01)
(Continued)

(52) U.S. Cl.
CPC ........... *G09G 3/3413* (2013.01); *B60R 1/088* (2013.01); *B60R 1/12* (2013.01);
(Continued)

(58) Field of Classification Search
CPC .. G09G 3/3413; G09G 3/36; G09G 2320/064; G09G 2340/0492;
(Continued)

(56) References Cited

U.S. PATENT DOCUMENTS

| | | | |
|---|---|---|---|
| 9,446,716 B2 * | 9/2016 | Bouaziz | |
| 2011/0062441 A1 * | 3/2011 | Yabuta | H01L 29/78633 257/43 |

(Continued)

FOREIGN PATENT DOCUMENTS

| | | |
|---|---|---|
| CN | 202815955 U | 3/2013 |
| CN | 103543568 A | 1/2014 |
| CN | 104619558 A | 5/2015 |

OTHER PUBLICATIONS

MIT OpenCourseWare, "Liquid Crystals in Displays", posted in May 2011. p. 24. https://ocw.mit.edu/courses/electrical-engineering-and-computer-science/6-007-electromagnetic-energy-from-motors-to-lasers-spring-2011/lecture-notes/MIT6_007S11_lec26.pdf.*

(Continued)

*Primary Examiner* — Chong Wu
(74) *Attorney, Agent, or Firm* — Womble Bond Dickinson (US) LLP

(57) ABSTRACT

An in-vehicle rear-view display system is described, comprising: a display device comprising a dimming device configured to adjust luminance of light emitted from the display device based on a color change of the dimming device; a first control unit connected with the dimming device and configured to control the color change of the dimming device in accordance with a luminance change of (Continued)

an irradiation light. By arranging in the display device a dimming device capable of adjusting the luminance of light emitted from the display device, the first control unit can control the color change of the dimming device in accordance with the luminance change of the ambient light, and thereby control the luminance of light emitted from the display device so as to preventing glare. Meanwhile, the poor clarity of the screen caused by an anti-glare screen film added to the screen of the display device is avoided.

13 Claims, 3 Drawing Sheets

(51) Int. Cl.
  *G02F 1/1335* (2006.01)
  *G06F 3/01* (2006.01)
  *G09G 3/36* (2006.01)
  *B60R 1/12* (2006.01)
  *G02F 1/1333* (2006.01)

(52) U.S. Cl.
  CPC ........ *G02F 1/133528* (2013.01); *G06F 3/013* (2013.01); *G09G 3/36* (2013.01); *B60R 2001/1253* (2013.01); *G02F 2001/133302* (2013.01); *G09G 2320/064* (2013.01); *G09G 2320/0666* (2013.01); *G09G 2340/0492* (2013.01); *G09G 2354/00* (2013.01); *G09G 2360/144* (2013.01); *G09G 2380/10* (2013.01)

(58) Field of Classification Search
  CPC ......... G09G 2354/00; G09G 2360/144; G09G 2380/10; B60R 1/088; G02F 1/133528; G02F 2001/133302; G06F 3/013
  See application file for complete search history.

(56) References Cited

U.S. PATENT DOCUMENTS

| | | | | |
|---|---|---|---|---|
| 2015/0235084 A1* | 8/2015 | Cho | ........................ | A61B 3/113 345/581 |
| 2015/0298622 A1* | 10/2015 | Bilger | ..................... | B60R 13/02 359/241 |
| 2015/0334354 A1* | 11/2015 | Uken | ........................ | B60R 1/04 348/148 |

OTHER PUBLICATIONS

Product page of "AUTO-VOX T1400 4.3 LCD Auto Adjusting Brightness Car Rearview back up Mirror Monitor Screen for Rear View License Plate Backup Camera for Most Car Model", p. 1-3, Mar. 25, 2014. https://www.amazon.com/AUTO-VOX-Adjusting-Brightness-Rearview-Monitor/dp/B00J863EI2.*
Office Action in Chinese Application No. 201610073154.2 dated Nov. 25, 2016, with English translation. 5 pages.
Decision on Rejection in Chinese Application No. 201610073154.2 dated Feb. 17, 2017, with English translation. 9 pages.
Office Action in Chinese Application No. 201610073154.2 dated Jul. 21, 2016, with English translation. 9 pages.
Search Report in Chinese Application No. 201610073154.2 dated May 11, 2016, with English translation.
"Notice of Reexamination," CN Application No. 201610073154.2 (dated Nov. 29, 2017).
Examination Decision Regarding Request for Reexamination (No. 138116) received for Chinese Patent Application No. 201610073154.2, dated Feb. 5, 2018, 40 pages (26 pages of English Translation and 14 pages of Office Action).

* cited by examiner

IN-VEHICLE REAR-VIEW DISPLAY SYSTEM AND DISPLAY METHOD

RELATED APPLICATIONS

The present application claims the benefit of Chinese Patent Application No. 201610073154.2, filed on Feb. 2, 2016, the entire disclosure of which is incorporated herein by reference.

FIELD

This disclosure relates to the technical field of display, and in particular to an in-vehicle rear-view display system and a display method.

BACKGROUND ART

"Glare" is an undesirable illumination phenomenon. When luminance of a light source is extremely high or a luminance difference between a background and a field-of-view center is very great, "glare" will be generated. The "glare" phenomenon influences not only viewing, but also health of vision. In the prior art, an anti-glare film is added to a display screen to alleviate the glare phenomenon. The film comprises tiny coarse particles and absorbs light to prevent the display screen from reflecting light. However, clarity of the screen will be affected, and in particular when the screen displays a white color, a fine blur phenomenon may take place, which influences viewing.

SUMMARY

According to a first aspect of this disclosure, an in-vehicle rear-view display system is provided, comprising: a display device comprising a dimming device configured to adjust luminance of light emitted from the display device based on a color change of the dimming device; a first control unit connected with the dimming device and configured to control the color change of the dimming device in accordance with a luminance change of an irradiation light.

Since the display device of the display system is provided with a dimming device capable of adjusting the luminance of light emitted from the display device, the first control unit can control the color change of the dimming device in accordance with the luminance change of the ambient light, and thereby control the luminance of light emitted from the display device so as to achieve the goal of preventing glare. Meanwhile, the problem of poor clarity of the screen caused by an anti-glare screen film added to the screen of the display device is avoided.

Optionally, the display device and the first control unit are two independent devices, or the first control unit is arranged inside the display device.

Optionally, the first control unit and the dimming device are connected via a wired or wireless connection.

Optionally, the material of the dimming device is an electrochromic material.

Optionally, the display device comprises an upper polarizing plate, an upper glass substrate, a liquid crystal layer, a lower glass substrate and a lower polarizing plate, and the dimming device is arranged between the upper polarizing plate and the upper glass substrate of the display device as an electrochromic layer.

Optionally, the display system further comprises: a photosensitive unit arranged on a display side of the display device and configured to measure luminance of the ambient light; and a luminance calculating unit connected with the photosensitive unit and configured to determine, when the luminance of the ambient light measured by the photosensitive unit is determined to have changed, a luminance change amount of the ambient light within a preset time period in accordance with the luminance of the ambient light measured by the photosensitive unit and the tine when the corresponding change takes place; wherein the first control unit is configured to control, in accordance with a value of the luminance change amount and a corresponding relationship between luminance change amounts and color modes of the dimming device, the dimming device to be in a corresponding color mode when an absolute value of the luminance change amount determined by the luminance calculating unit is greater than a preset luminance threshold, and wherein the color modes of the dimming device are divided according to the luminance of light emitted by the dimming device.

Optionally, the photosensitive unit can be a photosensitive sensor.

Optionally, the display system further comprises: a visual tracking device configured to acquire an orientation of eyes of a viewer when the viewer looks towards the display device; a signal processing unit connected with the visual tracking device and configured to: determine a relative angle of the eyes with respect to the display device based on the orientation of the eyes acquired by the visual tracking device and a current position of the display device; determine an optimal angle of the display device for the viewer to currently view the display device according to the determined relative angle and a corresponding relationship between relative angles of the eyes with respect to the display device and optimal angles of the display device; determine an orientation and an angle in which the display device should be adjusted based on the determined optimal angle of the display device and the current position of the display device; an adjusting device connected with the signal processing unit and configured to adjust the display device based on the orientation and the angle in which the display device should be adjusted as determined by the signal processing unit.

Optionally, the display system further comprises: a communication unit, configured to perform voice and/or message communication with other communication devices.

Optionally, the display system further comprises: a camera connected with the display device and configured to shoot and record a situation behind the vehicle. In this case, the display device can be further configured to display the situation behind the vehicle as shot by the camera.

Optionally, the display system further comprises: a second control unit, configured to control the camera and the display device to be turned on when the vehicle is determined to be in a start-up state; and control the camera to be turned off when the vehicle is determined to be in an ignition-off state.

Optionally, the display system further comprises: a third control unit, configured, when the vehicle is determined to be in an ignition-off state, to control the display device to be turned on if the display device needs to execute a display function; and control the display device to be turned off if not.

Optionally, the display system further comprises: a mirror arranged outside the vehicle and comprising the dimming device.

According to a second aspect of this disclosure, a display method adapted for an in-vehicle rear-view display device is provided, the method comprising: adjusting luminance of light emitted by the display device based on a luminance change of an ambient light.

DETAILED DESCRIPTION

The embodiments of this disclosure shall be described clearly and completely in the following text with reference to the drawings. Apparently, the embodiments described are only a part of the embodiments of this disclosure, rather than all of them.

Figure 1:
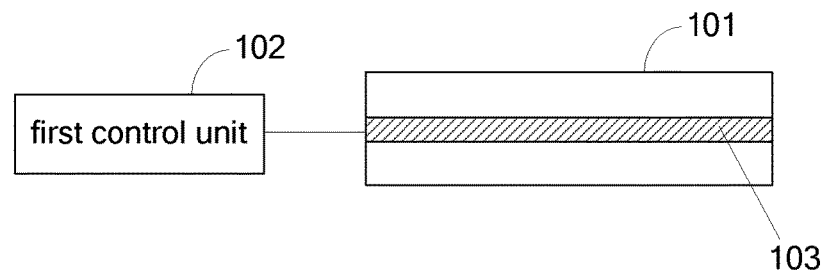
FIG. 1 is a schematic structural view of an in-vehicle rear-view display system according to an embodiment of this disclosure.

FIG. 1 is a schematic structural view of an in-vehicle rear-view display system according to an embodiment of this disclosure. As shown in FIG. 1, the in-vehicle rear-view display system comprises a display device 101 and a first control unit 102.

The display device 101 comprises a dimming device 103 configured to adjust luminance of light emitted from the display device 101 based on a color change of the dimming device.

The first control unit 102 is connected with the dimming device 103 and configured to control the color change of the dimming device 103 in accordance with a luminance change of an irradiation light.

Although display screens in the prior art can achieve an anti-glare effect by adding a screen film, the added screen film will affect clarity of the screen. In contrast, in the display device of the display system provided in the embodiment of this disclosure, no anti-glare screen film is added to the screen, but instead, a dimming device is arranged inside the display device. The first control unit in the display system can control the color of the dimming device in accordance with the luminance change of the ambient light, and thereby control the luminance of light emitted from the display device so as to achieve a goal of preventing glare. Meanwhile, the problem of poor clarity of the screen caused by an anti-glare screen film added to the screen of the display device is avoided.

Optionally, the material of the dimming device 103 is an electrochromic material. Electrochromism refers to a phenomenon in which optical properties (such as reflectivity, transmittivity, absorptivity) of a material can change steadily and reversibly, and it is exhibited in appearance as reversible changes in color and transparency. Materials having an electrochromic performance are called electrochromic materials. Of course, any material that can be used to adjust the luminance of light emitted from the display device 101 in accordance with the luminance of the irradiation light can be used for fabricating the dimming device 103 in this disclosure.

As an example, the dimming device 103 adjusts the luminance of light emitted from the display device 101 through changes in its color, and as for how the luminance is adjusted, it can be set as needed. For example, two luminance thresholds can be set (a first luminance threshold and a second luminance threshold, and the first luminance threshold is greater than the second luminance threshold). When the luminance of the ambient light is greater than the first luminance threshold, the display device 101 tones down the luminance of light emitted from a display panel; and when the luminance of the ambient light is smaller than the second luminance threshold, the display device 101 tones up the luminance of light emitted from the display panel. Or, the dimming device 103 can comprise a plurality of color modes, and the following text will specifically describe how to adjust the luminance of light emitted from the display device 101 by changing the color mode of the dimming device 103.

Figure 2:
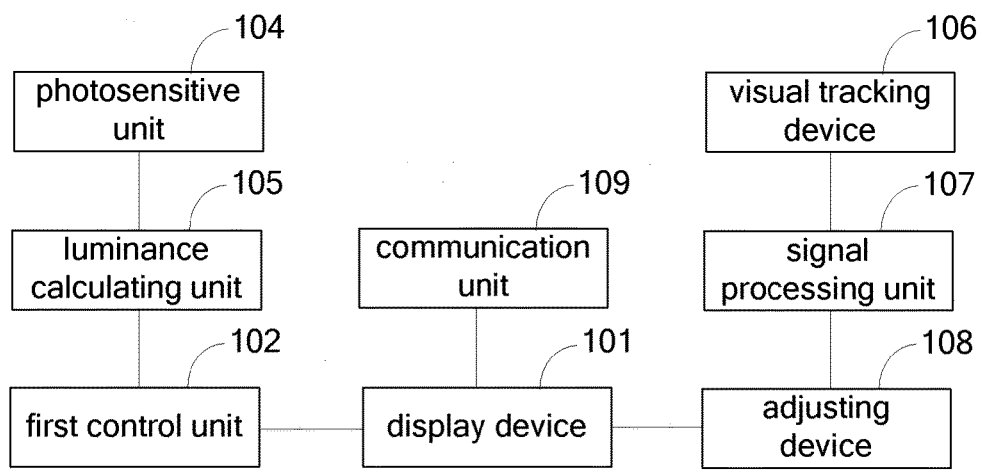
FIG. 2 is a schematic structural view of another in-vehicle rear-view display system according to an embodiment of this disclosure.

FIG. 2 is a schematic structural view of another in-vehicle rear-view display system according to an embodiment of this disclosure. As shown in FIG. 2, in order to enable adjustment of the luminance of light emitted from the display device 101 by changing the color mode of the dimming device 103, the in-vehicle rear-view display system can further comprise: a photosensitive unit 104 arranged on a display side of the display device 101 and configured to measure luminance of the ambient light; a luminance calculating unit 105 connected with the photosensitive unit 104 and configured to determine, when the luminance of the ambient light measured by the photosensitive unit 104 is determined to have changed, a luminance change amount of the ambient light within a preset time period in accordance with the luminance of the ambient light measured by the photosensitive unit 104 and the time when the corresponding change of the ambient light takes place; and a first control unit 102 configured to control, in accordance with a value of the luminance change amount and a corresponding relationship between luminance change amounts and color modes of the dimming device 103, the dimming device 103 to be in a corresponding color mode when an absolute value of the luminance change amount determined by the luminance calculating unit 105 is greater than a preset luminance threshold, wherein the color modes of the dimming device 103 are divided according to the luminance of light emitted by the dimming device 103.

In the embodiment, the photosensitive unit 104 is arranged on the display side of the display device 101 for measuring the luminance of the ambient light. Optionally, devices such as a photosensitive sensor in the prior art can be used as the photosensitive unit 104 in the embodiment of this disclosure. The photosensitive unit 104 sends the measured luminance of the ambient light to the luminance calculating unit 105 connected thereto.

Specifically, the luminance calculating unit 105 is mainly configured to determine whether the luminance of the ambient light measured by the photosensitive unit 104 has changed, and in case of a change, determine a luminance change amount of the ambient light within a preset time period in accordance with the luminance of the ambient light measured by the photosensitive unit 104 and the time when the corresponding change of the ambient light takes place. The reason why a luminance change amount of the ambient light within a preset time period is to be determined is that it is necessary to judge whether it is indeed glare based on a time period passing by after the luminance change since there are multiple cases in which the luminance of the ambient light changes.

For example, when the viewer carries a cell phone (i.e., the display device provided in the embodiment of this disclosure) and views it, the luminance of the ambient light changes greatly. Now, it is necessary to judge whether a time period t for which the luminance change amount of the ambient light maintains exceeds a preset time period T. If t<T (for example, the instance a vehicle exits a tunnel), it can be judged that a short luminance change has occurred, and it is unnecessary to control the dimming device 103 to initiate the anti-glare function; if t>T, it is necessary to control the dimming device 103 to be in a corresponding color mode.

After the luminance calculating unit 105 has determined the luminance change amount of the ambient light, it sends the change amount to the first control unit 102. The first control unit 102 judges whether the change amount is greater than a preset luminance threshold and control, in accordance with a value of the luminance change amount and a corresponding relationship between luminance change amounts and color modes of the dimming device, the dimming device 103 to be in a corresponding color mode when the change amount is greater than the preset luminance threshold (i.e., a glare effect is produced).

The corresponding relationship between luminance change amounts and color modes of the dimming device 103 is established to facilitate control of the dimming device 103. The color mode of the dimming device 103 can be associated with the luminance of the ambient light, so the luminance change amounts of the ambient light can be divided into multiple different ranges, each of which corresponds to a color mode of the dimming device 103. Both the color modes of the dimming device 103 and the ranges of the luminance change amount can be divided upon actual situations, which will not be limited here.

As shown in FIG. 2, in order to enable the display device 101 provided in the embodiment of this disclosure to automatically adjust the angle of the display device 101 in accordance with a position of eyes of a viewer, the display system can further comprise: a visual tracking device 106, a signal processing unit 107 and an adjusting device 108.

The visual tracking device 106 is configured to acquire an orientation of the eyes when the viewer looks towards the display device 101.

The signal processing unit 107 is connected with the visual tracking device 106 and is configured to determine a relative angle of the eyes of the viewer with respect to the display device 101 based on the orientation of the eyes acquired by the visual tracking device 106 and a current position of the display device 101; determine an optimal angle of the display device 101 for the viewer to currently view the display device 101 according to the determined relative angle and a corresponding relationship between relative angles of the eyes with respect to the display device 101 and optimal angles of the display device 101; determine an orientation and an angle in which the display device 101 should be adjusted based on the determined optimal angle of the display device 101 and the current position of the display device 101.

The adjusting device 108 is connected with the signal processing unit 107 and is configured to adjust the display device 101 based on the orientation and the angle in which the display device 101 should be adjusted as determined by the signal processing unit 107.

In the embodiment, in order to enable the display device 101 to automatically adjust the angle based on the position of the eyes of the viewer, the display system in the embodiment of this disclosure comprises a visual tracking device 106 capable of acquiring an orientation of eyes which can acquire orientation information of the eyes of the viewer when the viewer looks towards the display device 101 and send the orientation information to the signal processing unit 107.

In the embodiment, the signal processing unit 107 connected with the visual tracking device 106 can determine a relative angle between the eyes of the viewer and the display device 101 based on the orientation of the eyes of the viewer acquired by the visual tracking device 106 and the determined current position of the display device 101. In order to enable the display device 101 to accurately adjust the angle of its own based on the position of the eyes, a corresponding relationship between relative angles of the eyes of the viewer with respect to the display device and optimal angles of the display device 101 is preset. Therefore, the optimal angle in which the display 101 should be when the viewer currently views the display device 101 can be determined based on the determined relative angle, and the corresponding relationship between relative angles of the eyes with respect to the display device 101 and optimal angles of the display device 101. Furthermore, an orientation and an angle in which the display device 101 should be adjusted when it is adjusted from the current position to the optimal angle can be determined based on the determined optimal angle of the display device 101 and the previously determined current position of the display device 101.

After the signal processing unit 107 has determined the orientation and the angle in which the display device 101 should be currently adjusted, the adjusting device 108 adjusts the display device 101 (i.e., adjusting its orientation and angle) based on the orientation and the angle in which the display device 101 should be adjusted as determined by the signal processing unit 107.

Optionally, in addition to the above eye tracking function, as shown in FIG. 2, the display system provided in the embodiment of this disclosure can further comprise: a communication unit 109, configured to perform voice and/or message communication with other communication devices. Apart from being utilized for communication functions, the above display device 101 for preventing glare can further be utilized to play videos, music, or perform voice chat and so on upon personal needs.

It should be pointed out that whether each unit mentioned above and the display device 101 are a structure that is integral or devices that are separate and independent can be selected as needed. Optionally, the display device 101 and the first control unit 102 are two independent devices, or the first control unit 102 is arranged inside the display device 101. The first control unit 102 and the dimming device 103 are connected via a wired or wireless connection.

Other units comprised in the above display system, for instance, the photosensitive unit 104, the luminance calculating unit 105, the visual tracking device 106, the signal processing unit 107, the adjusting device 108 and the communication unit 109, can also be fabricated as a structure that is integral with the display device 101 or devices that are separate from and independent of the display device 101 as needed.

The type of the display device 101 in the embodiments of this disclosure is not limited, and the display device can be an OLED display screen, an LED display screen or a liquid crystal display screen and so on. In order to explain the structure of the display device 101 more clearly, the embodiments of this disclosure are explained by taking an ordinary LCD display screen and a dimming device 103 composed of an electrochromic layer made of an electrochromic material as an example.

Figure 3:
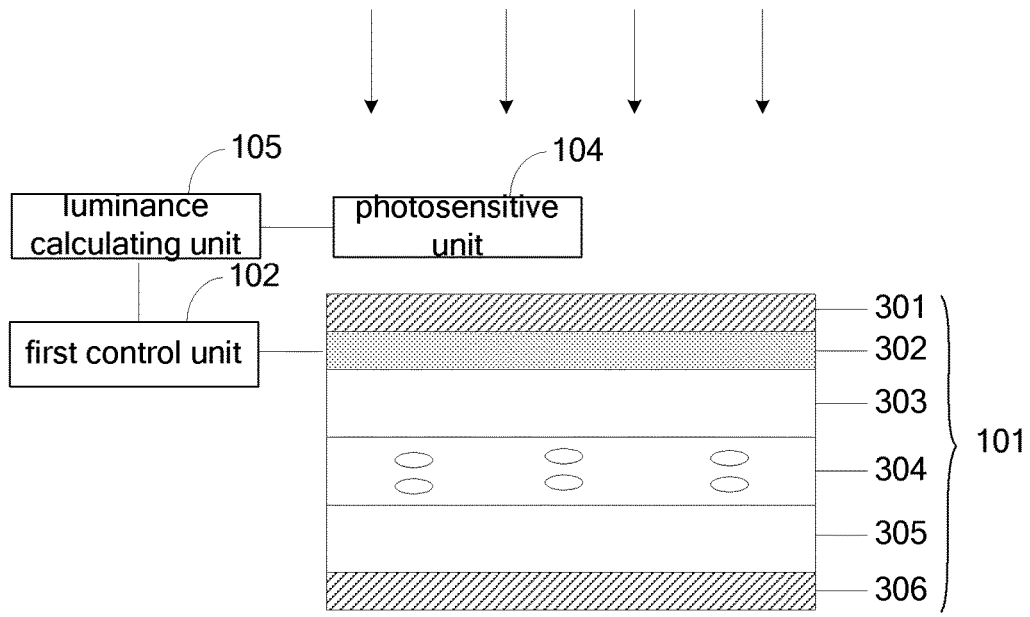
FIG. 3 is a schematic structural view of a display device in an in-vehicle rear-view display system according to an embodiment of this disclosure.

FIG. 3 is a schematic structural view of a display device in an in-vehicle rear-view display system according to an embodiment of this disclosure. As shown in FIG. 3, the display device 101 in the in-vehicle rear-view display system comprises: an upper polarizing plate 301, an electrochromic layer 302, an upper glass substrate 303, a liquid crystal layer 304, a lower glass substrate 305 and a lower polarizing plate 306. The arrows in the drawing represent irradiation light, and it should be pointed out that, except for the components shown in the drawing, other components connected with the display device 101 are not shown for simplicity. Generally, a basic architecture of an LCD display comprises two layers of polarizing plates (i.e., the upper polarizing plate 301 and the lower polarizing plate 306), two layers of glass substrates (i.e., the upper glass substrate 303 and the lower glass substrate 305), and a liquid crystal layer 304 arranged between the two layers of glass substrates. When the photosensitive unit 104 has sensed strong glare irradiation for a very long time period, the first control unit 102 controls the electrochromatic layer 302 to be in a corresponding color mode based on the luminance change amount determined by the luminance calculating unit 105, wherein the black electrochromatic layer 302 reflects diffusely the strong light or scatters it to reduce influence of the strong light on the viewer, thereby achieving an anti-glare effect. When the luminance of the ambient light varies, the color mode of the electrochromatic layer 302 also varies.

Figure 4:
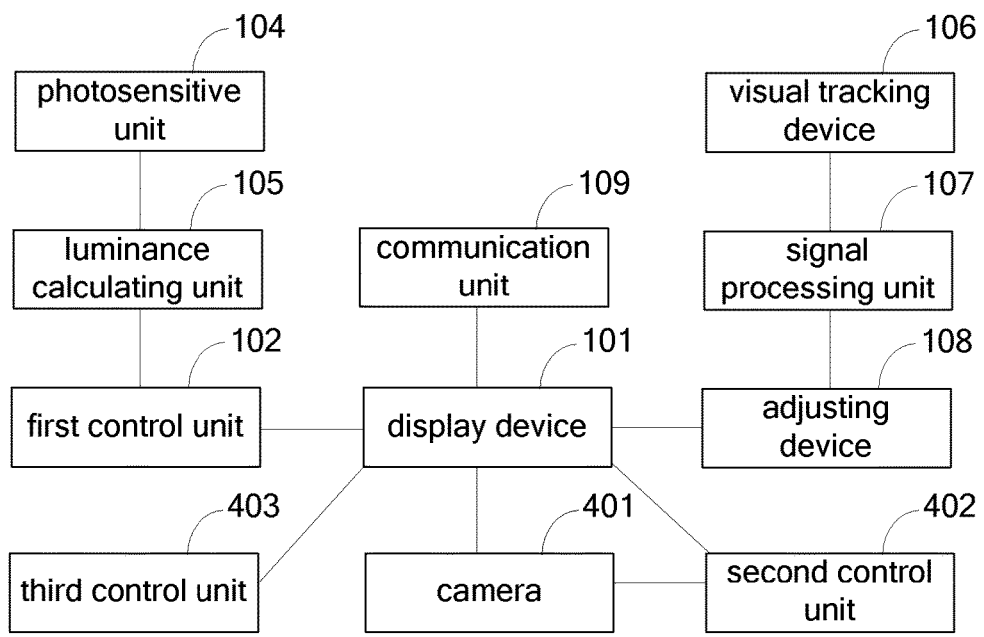
FIG. 4 is a schematic structural view of yet another in-vehicle rear-view display system according to an embodiment of this disclosure.

In order to enable the above display system to be used as a rear-view mirror of the vehicle during drive, a camera capable of shooting a situation behind the vehicle can be added in the above display system. FIG. 4 is a schematic structural view of such an in-vehicle rear-view display system. As shown in FIG. 4, the display system further comprises: a camera 401 connected with the display device 101 and configured to shoot and record a situation behind the vehicle; wherein the display device 101 is further configured to display the situation behind the vehicle as shot by the camera 401.

The display device 101 is connected with a camera 401 which can shoot in real time a situation behind the vehicle where the in-vehicle rear-view display system is located such that the display device 101 can display in real time the situation behind the vehicle as shot by the camera 401. Meanwhile, contents shot by the camera 401 can also be recorded in real time, i.e., a function of a car recorder can be achieved in addition to the function of an anti-glare display device. Besides, a front-facing camera 401 can also be added for shooting and recording in real time a situation in front of the vehicle as drive records.

Optionally, in order to flexibly control the ON and OFF of the display device, the display system further comprises: a second control unit 402, configured to control the camera 401 and the display device 101 to be turned on when the vehicle is determined to be in a start-up state; and control the camera 401 to be turned off when the vehicle is determined to be in an ignition-off state.

In an embodiment, the ON and OFF of the camera 401 and the display device 101 can be controlled manually. When the vehicle is in a start-up state, if it is necessary to observe the situation behind the vehicle, the camera 401 and the display device 101 are turned on; when the vehicle is determined to be in an ignition-off state, the camera 401 can be turned off if the vehicle is stopped and unused.

Optionally, the display system further comprises a third control unit 403, configured, when the vehicle is determined to be in an ignition-off state, to control the display device 101 to be turned on if it is necessary for the display device 101 to execute a display function; and control the display device 101 to be turned off if not. In other words, when the vehicle is powered off but it is necessary for the display device 101 to display contents, for instance to execute functions such as listening to music or making a voice call, the display device 101 can be turned on separately under control without turning on the camera 401, and when it is unnecessary to execute a display function, the display device 101 is turned off under control.

Optionally, the display system can further comprise a vehicle drive state monitoring unit for determining a drive state of the vehicle based on a corresponding relationship between different preset values of speed and acceleration and drive states of the vehicle, and a current speed and acceleration of the vehicle that have been measured. In other words, the current drive state of the vehicle can be judged automatically based on the current speed and acceleration of the vehicle.

Figure 5:
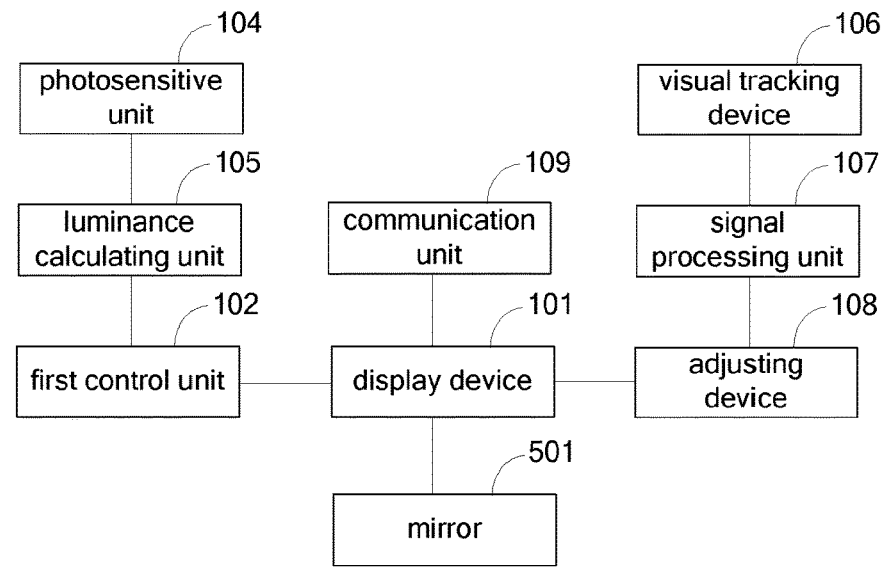
FIG. 5 is a schematic structural view of still another in-vehicle rear-view display system according to an embodiment of this disclosure.

As shown in FIG. 5, in order to also endow an exterior rear-view mirror of the vehicle with an anti-glare function, the display system can further comprise: a mirror 501 arranged outside the vehicle and comprising a dimming device 103.

The material of the dimming device 103 can be an electrochromic material, and for the description of the dimming device 103, the description of the dimming device 103 in the embodiment of the above display device 101 can be referred to.

Based on the same concept, a display method for used in an in-vehicle rear-view display system is further provided in an embodiment of this disclosure. Since the principle of the display method for solving problems is similar to that of the in-vehicle rear-view display system provided in the embodiments of this disclosure for solving problems, the implementation of the display method can be referred to the implementation of the display system, and repetitive portions will not be described for simplicity.

Figure 6:
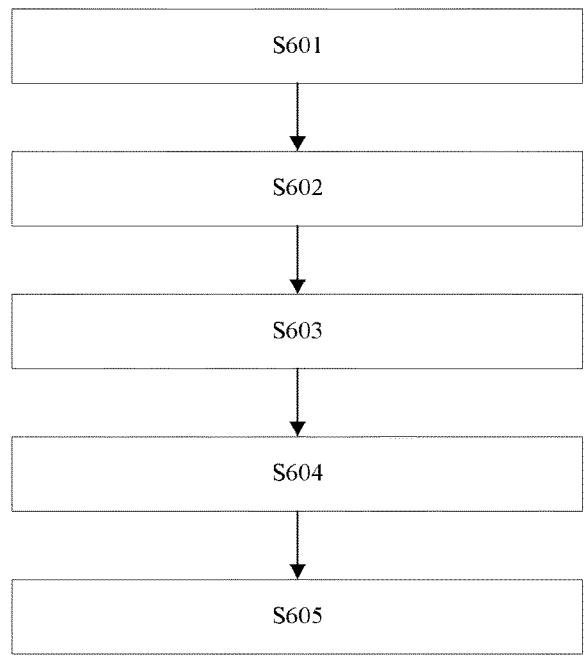
FIG. 6 is a display method for use in an in-vehicle rear-view display system according to an embodiment of this disclosure.

FIG. 6 shows a display method for use in an in-vehicle rear-view display system according to an embodiment of this disclosure. The method comprises: at step S601, adjusting luminance of light emitted from the display device based on a luminance change of an ambient light.

Optionally, the adjusting comprises adjusting the luminance of light emitted from the display device based on a color change of an electrochromic material in the display device.

Optionally, the method further comprises: at step S602, determining, when the measured luminance of the ambient light is determined to have changed, a luminance change amount of the ambient light within a preset time period in accordance with the measured luminance of the ambient light and the time when the luminance change of the ambient light takes place; at step S603, controlling, in accordance with a value of the luminance change amount and a corresponding relationship between luminance change amounts and color modes of the dimming device, the display device to display a corresponding color mode when an absolute value of the luminance change amount is determined to be greater than a preset luminance threshold, wherein the color modes of the dimming device are divided according to the luminance of light emitted by the dimming device.

Optionally, the method further comprises: at step S604, acquiring an orientation and an angle of the eyes of the viewer with respect to the display device, and determining an orientation and an angle in which the display device should be adjusted based on a preset optimal angle of the eyes of the viewer with respect to the display device and a current position of the display device; and at step S605, adjusting the display device based on the determined orientation and angle in which the display device should be adjusted.

Apparently, those skilled in the art can make various modifications and variations to the embodiments of the present disclosure without deviating from the spirits and scopes of the present disclosure. Thus if the modifications and variations to the embodiments of the present disclosure fall within the scopes of the claims of the present invention and the equivalent techniques thereof, the present invention is intended to include them too.

The invention claimed is:

1. An in-vehicle rear-view display system, comprising:
   a display device comprising a dimming device configured to adjust luminance of light emitted from the display device based on a color change of the dimming device;
   a first controller comprising hardware, the first controller being connected with the dimming device and configured to control the color change of the dimming device in accordance with a luminance change of an ambient light;
   a photosensitive sensor arranged on a display side of the display device and configured to measure luminance of the ambient light;
   a luminance calculator connected with the photosensitive sensor and configured to calculate, in response to determining that the luminance of the ambient light measured by the photosensitive sensor has changed, a luminance change amount of the ambient light and a time period Δt during which the luminance change amount of the ambient light is maintained;
   wherein the first controller is configured to control, in accordance with the calculated luminance change amount and a corresponding relationship between luminance change amounts and color modes of the dimming device, the dimming device to be in a corresponding color mode in response to determining that an absolute value of the luminance change amount being greater than a preset luminance threshold and the time period Δt exceeds a preset time period T, and wherein the color modes of the dimming device are divided according to the luminance of light emitted by the dimming device.

2. The display system according to claim 1, wherein the display device and the first controller are two independent devices, or the first controller is arranged inside the display device.

3. The display system according to claim 1, wherein the first controller and the dimming device are connected via a wired or wireless connection.

4. The display system according to claim 1, wherein the material of the dimming device is an electrochromic material.

5. The display system according to claim 4, wherein the display device comprises an upper polarizing plate, an upper glass substrate, a liquid crystal layer, a lower glass substrate and a lower polarizing plate, and the dimming device is arranged between the upper polarizing plate and the upper glass substrate of the display device as an electrochromic layer.

6. The display system according to claim 1, further comprising:
   a visual tracking device configured to acquire an orientation of eyes of a viewer looking towards the display device;
   a signal processor comprising hardware which is connected with the visual tracking device and configured to: determine a relative angle of the eyes with respect to the display device based on the orientation of the eyes acquired by the visual tracking device and a current position of the display device; determine an optimal angle of the display device for the viewer to currently view the display device according to the determined relative angle and a corresponding relationship between relative angles of the eyes with respect to the display device and optimal angles of the display device; determine an orientation and an angle in which the display device should be adjusted based on the determined optimal angle of the display device and the current position of the display device;
   an adjusting device connected with the signal processor and configured to adjust the display device based on the orientation and the angle in which the display device should be adjusted as determined by the signal processor.

7. The display system according to claim 1, further comprising:
   a camera connected with the display device and configured to shoot and record a situation behind the vehicle.

8. The display system according to claim 7, wherein the display device is further configured to display the situation behind the vehicle as shot by the camera.

9. The display system according to claim 7, further comprising:
   a second controller comprising hardware, the second controller being configured to control the camera and the display device to be turned on in response to determining the vehicle is in a start-up state; and control the camera to be turned off in response to determining the vehicle is in an ignition-off state.

10. The display system according to claim 7, further comprising:
    a third controller comprising hardware, the third controller being configured, in response to determining the vehicle is in an ignition-off state, to control the display device to be turned on if it is necessary for the display device to execute a display function, and control the display device to be turned off if not.

11. The display system according to claim 1, further comprising:
    a mirror arranged outside the vehicle and comprising another dimming device.

12. A display method adapted for an in-vehicle rear-view display device comprising a dimming device, comprising:
    in response to determining that a luminance of the ambient light has changed, determining a luminance change amount of the ambient light and a time period Δt for which the luminance change amount of the ambient light maintains;
    controlling, in accordance with a value of the luminance change amount and a corresponding relationship between luminance change amounts and color modes of the dimming device, the dimming device to be in a corresponding color mode in response to determining that an absolute value of the luminance change amount is greater than a preset luminance threshold and the time period Δt exceeds a preset time period T, and wherein the color modes of the dimming device are divided according to the luminance of light emitted by the dimming device adjusting luminance of light emitted from the display device based on the color mode of the dimming device.

13. The display method according to claim 12, further comprising:

acquiring an orientation and an angle of the eyes of a viewer with respect to the display device;

determining an orientation and an angle in which the display device should be adjusted based on a preset optimal angle of the eyes of the viewer with respect to the display device and a current position of the display device;

adjusting the display device based on the determined orientation and angle in which the display device should be adjusted.

* * * * *